United States Patent
Ramadge et al.

(10) Patent No.: US 11,886,681 B2
(45) Date of Patent: Jan. 30, 2024

(54) STANDARDIZING USER INTERFACE ELEMENTS

(71) Applicant: eBay Inc., San Jose, CA (US)

(72) Inventors: David A. Ramadge, San Jose, CA (US); Justin Van Winkle, San Jose, CA (US); Corinne Elizabeth Sherman, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/124,456

(22) Filed: Mar. 21, 2023

(65) Prior Publication Data
US 2023/0221827 A1    Jul. 13, 2023

Related U.S. Application Data

(63) Continuation of application No. 17/317,799, filed on May 11, 2021, now Pat. No. 11,644,938, which is a continuation of application No. 16/400,865, filed on May 1, 2019, now Pat. No. 11,036,347, which is a
(Continued)

(51) Int. Cl.
| | |
|---|---|
| *G06F 3/0481* | (2022.01) |
| *G06F 3/04847* | (2022.01) |
| *G06F 3/04817* | (2022.01) |
| *G06F 9/445* | (2018.01) |

(Continued)

(52) U.S. Cl.
CPC ........ *G06F 3/0481* (2013.01); *G06F 3/04817* (2013.01); *G06F 3/04847* (2013.01); *G06F 9/4451* (2013.01); *G06F 9/451* (2018.02); *G06F 21/36* (2013.01)

(58) Field of Classification Search
CPC ...... G06F 3/0481; G06F 9/451; G06F 9/4451; G06F 3/04817; G06F 3/04847
See application file for complete search history.

(56) References Cited

U.S. PATENT DOCUMENTS

| | | |
|---|---|---|
| 5,459,825 A | 10/1995 | Anderson et al. |
| 6,324,546 B1 | 11/2001 | Ka et al. |
| 6,549,217 B1 | 4/2003 | De Greef et al. |

(Continued)

OTHER PUBLICATIONS

"Advisory Action", U.S. Appl. No. 14/685,988, dated Jan. 8, 2019, 2 pages.
(Continued)

*Primary Examiner* — Andrey Belousov
(74) *Attorney, Agent, or Firm* — FIG. 1 Patents

(57) ABSTRACT

A system and method for standardizing user interface elements are presented. A first application is identified having a higher use metric than a second application, the first application including one or more user interface elements that have one or more respective parameters. The second application has one or more user interface elements that are similar to the user interface elements of the first application and has one or more respective parameters that are different than the respective parameters of the user interface elements of the first application. A determination of similarity is made between the user interface elements applications based upon at least one predetermined criterion. Based on the determination, one or more parameters of the user interface elements of the second application are modified to match one or more parameters of the first application.

20 Claims, 14 Drawing Sheets

Related U.S. Application Data continuation of application No. 14/685,988, filed on Apr. 14, 2015, now Pat. No. 10,372,285.

(51) Int. Cl.
*G06F 9/451* (2018.01)
*G06F 21/36* (2013.01)

(56) References Cited

U.S. PATENT DOCUMENTS

| | | | |
|---|---|---|---|
| 6,785,822 | B1 | 8/2004 | Sadhwani-Tully et al. |
| 7,472,376 | B2 | 12/2008 | Burcham et al. |
| 8,197,345 | B2 | 6/2012 | Godfrey et al. |
| 8,769,442 | B2 | 7/2014 | Khosravy et al. |
| 10,372,285 | B2 | 8/2019 | Ramadge et al. |
| 11,036,347 | B2 | 6/2021 | Ramadge et al. |
| 11,644,938 | B2 | 5/2023 | Ramadge et al. |
| 2003/0067489 | A1 | 4/2003 | Candy Wong et al. |
| 2010/0070884 | A1* | 3/2010 | Bromenshenkel .... G06F 3/0481 715/757 |
| 2010/0268844 | A1 | 10/2010 | Quinlan et al. |
| 2011/0105232 | A1* | 5/2011 | Godfrey ................ A63F 13/335 463/43 |
| 2011/0225417 | A1* | 9/2011 | Maharajh ............... G06Q 10/06 713/150 |
| 2014/0365895 | A1* | 12/2014 | Magahern ........... G06F 3/04842 715/762 |
| 2016/0306502 | A1 | 10/2016 | Ramadge et al. |
| 2019/0258358 | A1 | 8/2019 | Ramadge et al. |
| 2021/0263620 | A1 | 8/2021 | Ramadge et al. |

OTHER PUBLICATIONS

"Final Office Action", U.S. Appl. No. 14/685,988, dated Oct. 18, 2017, 9 pages.
"Final Office Action", U.S. Appl. No. 14/685,988, dated Dec. 13, 2018, 11 pages.
"First Action Interview Office Action", U.S. Appl. No. 14/685,988, dated May 30, 2017, 5 pages.
"Non-Final Office Action", U.S. Appl. No. 17/317,799, dated Apr. 25, 2022, 9 pages.
"Non-Final Office Action", U.S. Appl. No. 14/685,988, dated May 16, 2018, 9 pages.
"Non-Final Office Action", U.S. Appl. No. 16/400,865, dated Jun. 11, 2020, 8 pages.
"Notice of Allowance", U.S. Appl. No. 14/685,988, dated Mar. 20, 2019, 6 pages.
"Preinterview First Office Action", U.S. Appl. No. 14/685,988, dated Feb. 9, 2017, 4 pages.
U.S. Appl. No. 14/685,988 , "Applicant-Initiated Interview Summary for U.S. Appl. No. 14/685,988, dated Nov. 16, 2017", dated Nov. 16, 2017, 3 Pages.
U.S. Appl. No. 16/400,865 , "Applicant Initiated Interview Summary Received for U.S. Appl. No. 16/400,865, dated Jul. 21, 2020", dated Jul. 21, 2020, 3 Pages.
U.S. Appl. No. 16/400,865 , "Final Office Action Received for U.S. Appl. No. 16/400,865, dated Nov. 24, 2020", dated Nov. 24, 2020, 11 Pages.
U.S. Appl. No. 16/400,865 , "Non Final Office Action Received for U.S. Appl. No. 16/400,865, dated Feb. 19, 2021", dated Feb. 19, 2021, 5 Pages.
U.S. Appl. No. 16/400,865 , "Notice of Allowance Received for U.S. Appl. No. 16/400,865, dated Mar. 11, 2021", dated Mar. 11, 2021, 8 Pages.
U.S. Appl. No. 17/317,799 , "Final Office Action", U.S. Appl. No. 17/317,799, dated Aug. 29, 2022, 11 pages.
U.S. Appl. No. 17/317,799 , "Final Office Action Received for U.S. Appl. No. 17/317,799, dated Jan. 14, 2022", dated Jan. 14, 2022, 12 Pages.
U.S. Appl. No. 17/317,799 , "Non Final Office Action Received for U.S. Appl. No. 17/317,799, dated Nov. 24, 2021", dated Nov. 24, 2021, 10 Pages.
U.S. Appl. No. 17/317,799, "Notice of Allowance", U.S. Appl. No. 17/317,799, dated Feb. 1, 2023, 10 pages.

* cited by examiner

User Interface Element Library

Menus
- Primary Menu
- Secondary Menu
- Context Menu
- Extra Menu

Buttons
- Affirm Button
- Yes/No Button
- Button 4
- Button 5

Drop Down Boxes
- DDB 1
- DDB 2

Text Fields
- Text Entry 100
- Text Entry 105
- Text Entry 110

Tabs

ScrollBars
- Primary Horizontal
- Primary Vertical

Labels
- Head Label
- Background Label

CheckBoxes

RadioButtons

Icons
- Main Icon

Cursors
- Primary Cursor
- Secondary Cursor

Application Purpose
- Messaging
- News
- Social Networking
- Media Management

Application Functions
- Share
- Make a Call
- Scroll
- Send To Trash
- Refine Search
- Screen Shot
- Take a Picture
- moveElement(location)
- modifyProperty(element, property)

*FIG. 5*

STANDARDIZING USER INTERFACE ELEMENTS

RELATED APPLICATION

This application is a continuation of and claims priority to U.S. patent application Ser. No. 17/317,799, filed May 11, 2021, which is continuation of and claims priority to U.S. patent application Ser. No. 16/400,865, filed May 1, 2019, which is a continuation of and claims priority to U.S. patent application Ser. No. 14/685,988, filed Apr. 14, 2015, entitled "Standardizing User Interface Elements", the entire disclosure of which is hereby incorporated by reference herein in its entirety.

BACKGROUND

Conventionally, different applications developed to operate on a computing device operate in different ways and use a wide variety of different user interface elements. A user of a first application may become familiar with the first application and may have difficult learning and/or using a second application. This may especially be the case when menus, buttons, and other user interface elements are at different locations.

After learning the first application, a user must typically learn how to use the second application. Furthermore, the applications may associate different inputs to different commands. Therefore, a user that has become familiar with the first application may not be able to effectively operate the second application. In one example, without learning the second application the user may input a command expecting behavior as with the first application. However, because the second application may have been programming differently, the input generally would cause a different command to be performed according to the programming of the second application.

BRIEF DESCRIPTION OF THE DRAWINGS

Various ones of the appended drawings merely illustrate example embodiments of the present disclosure and cannot be considered as limiting its scope.

FIG. 5 is an illustration depicting a user interface element library for standardizing user interface elements according to one example embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments a system, as described herein, monitors application usage for a user at a computing device. The system determines a first application based on the user using the first application more frequently than other applications available at the computing device. The system then determines respective parameters for one or more user interface elements as part of the first application and updates another application at the computing device according to the parameters of the user interface elements of the first application. In one specific, non-limiting example, the parameters are the location of the user interface elements.

Therefore, in certain example embodiments, the system adjusts user interface elements for applications operating at the computing device making them more consistent with a first application. Such adjustments provide a more consistent user interface for the user although the user may use many different applications from different developers.

In other embodiments, the user interface elements are predefined according to a library of user interface elements. The system may identify the user interface elements based on an application being programmed according to the library. The system identifies the specific user interface elements based, at least in part, a predetermined identifier included in the library of user interface elements. As many different applications are configured according to the library, the system may access the user interface elements and adjust their respective locations as described herein. Therefore, although a wide variety of different application may execute via the computing device, the system may modify parameters of one or more user interface elements so that the separately programmed applications interact with the user in similar ways.

Figure 1:
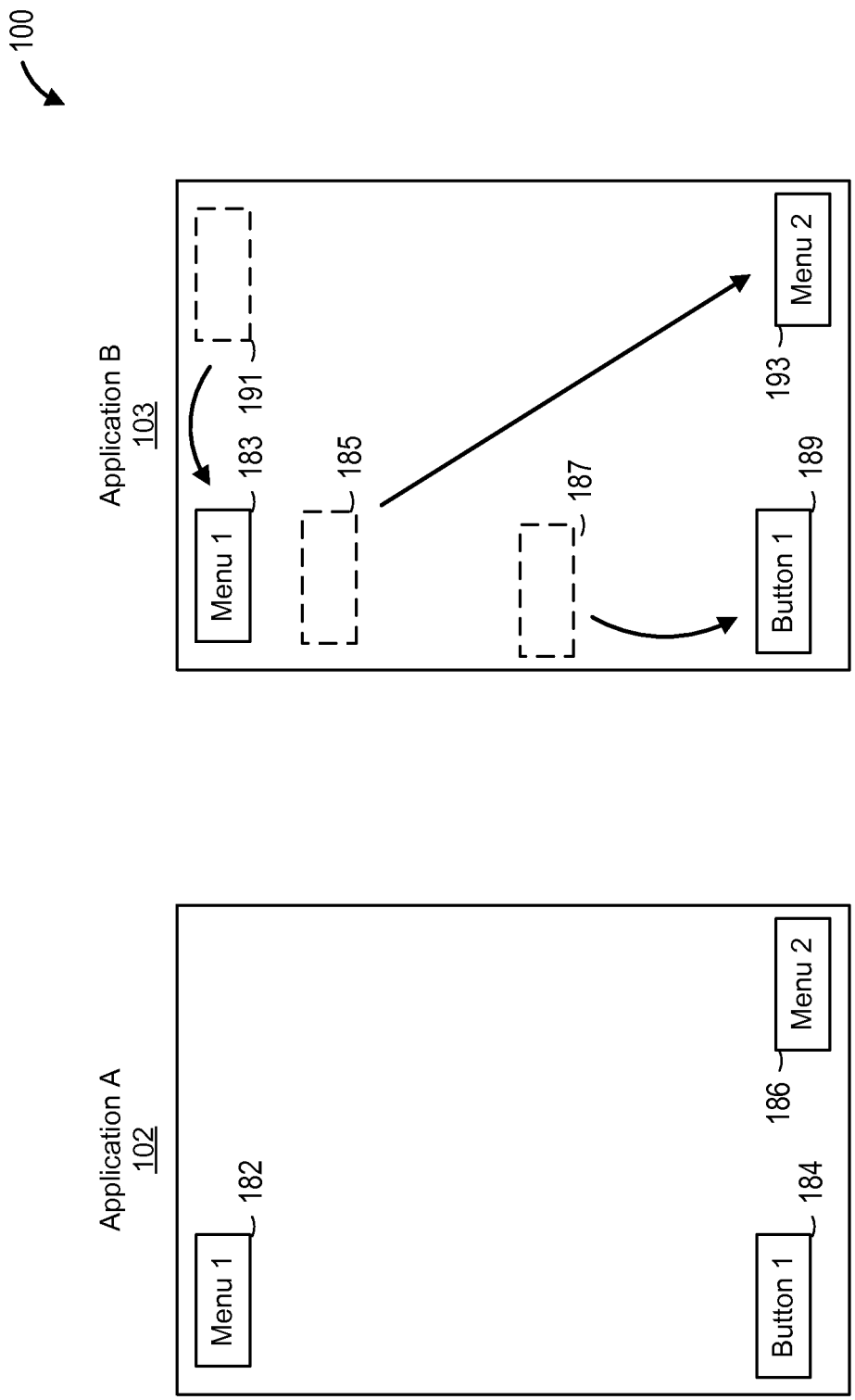
FIG. 1 is an illustration depicting one example embodiment of user interfaces according to one example embodiment.

FIG. 1 is an illustration depicting one example embodiment of user interfaces according to one example embodiment. As depicted in FIG. 1, a first application, Application A 102, and a second application, Application B 103 may present distinct user interfaces to the user.

In one example embodiment, a system (FIG. 2: 150) determines that Application A 102 is used more frequently by a user than Application B 103 based, at least in part, on a use metric. In one example, the use metric is number of days the application is used at least daily. Because Application A 102 may be used daily while Application B 103 is used weekly, Application A 102 would have a higher use metric. In another example, the use metric is a number of application instantiations. In this example, Application A 102 may have been executed more times than Application B 103. In another example, the use metric is time open and Application A 102 may have been left open for a longer period of time as compared with Application B 103. In another example embodiment, the use metric is interaction time and the user may interact with Application A 102 more frequently than with Application B 103. In another example embodiment, the use metric is command count and the system 150 may count commands received by the user to determine that the user uses Application A 102 more than Application B.

In another example embodiment, the use metric is feature use and the system 150 tracks specific features and/or commands in an application. For example, the system 150 may count a number of times a primary menu is accessed in Application A 102 and compare it with a number of times a primary menu is accessed in Application B 103. In response to the menu in Application A 102 being accessed more frequently than the menu in Application B 103, the system 150 determines that Application A 102 is used more frequently than Application B. Of course, one skilled in the art may recognize other use metrics in which Application A 102 may be used more frequently than Application B and this disclosure is meant to include all such ways. In one example embodiment, the system 150 select one of the use metrics based on a response from the user. In another example embodiment, the system 150 selects a use metric based, at least in part, on user behavior, or the like.

In one example embodiment, in response to the system 150 determining that Application A 102 is used more frequently than Application B 103, the system 150 may determine a parameter, such as a location 182, 184, 186 of one or more user interface components in Application A 102. The system 150 may also determine respective locations 191, 185, 187 of matching user interface components in Application B 103.

In response to determining that Application A 102 is used more frequently than Application B 103, the system 150, in one example embodiment, updates the locations (i.e. the parameters) of the user interface components (e.g. Menu 1, Menu 2, and Button 1) based on the locations of the matching user interface components in Application A 102. The system 150, in this example embodiment, moves Menu 1, from location 191 to location 183, Menu 2 from location 185 to location 193, and Button 1 from location 187 to location 189.

In one embodiment, moving an interface element to a location includes moving the interface element as close as possible to the location so as not to interfere with other interface elements. Therefore, although the location may indicate an exact location, moving an interface element to the location may mean moving the interface element close to the location. Of course, the system 150 may move other user interface elements and this disclosure is not limited in this regard. A user interface element, as described herein, includes, but is not limited to, menus, buttons, selection boxes, text boxes, group boxes, icons, embedded objects, drop down boxes, and other graphical user interface components, or the like.

The Applications 102, 104 may or may not be similar in their function and/or operation. In one example, the Application A 102 and the Application B 103 are both messaging applications. In another example, the Application A 102 is an image capture application, and the Application B is a word processor. Of course, the applications 102, 104 may be any other application and this disclosure is not limited in this regard. In another example embodiment, the Application A 102 and the Application B 103 are different versions of the same application. In one specific, non-limiting example, Application A 102 is an instant messaging and/or news update application and Application B 103, is a web browser.

Figure 2:
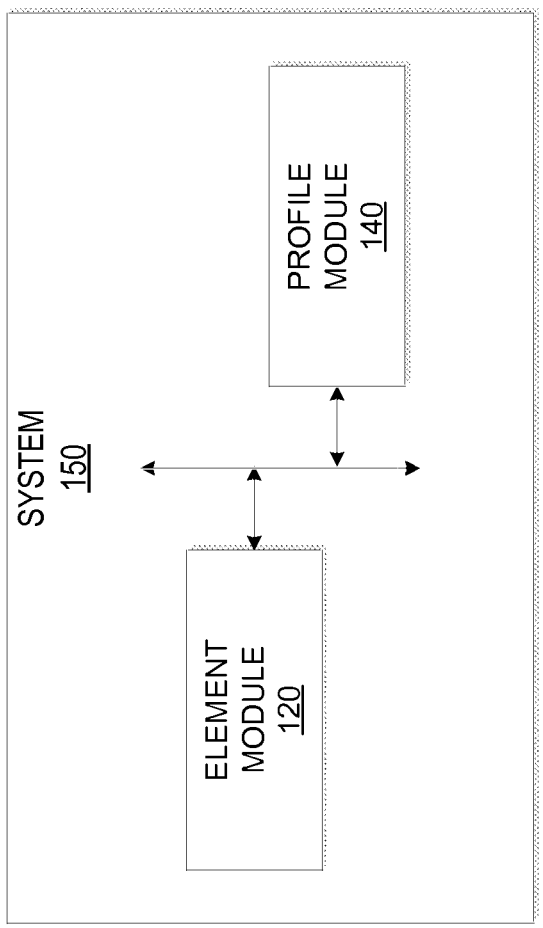
FIG. 2 is a block diagram illustrating an example of a system according to some example embodiments.

FIG. 2 is a block diagram illustrating an example of a system 150 according to some example embodiments. According to one example embodiment, the system 150 includes an element module 120 and a profile module 140.

In one example embodiment, the element module 120 is configured to determine respective locations of one or more user interface elements as part of an application. In one example embodiment, the user interface elements include a predetermined identifier. The element module 120, in one example, identifies the user interface elements based, at least in part, on a predetermined identifier. A predetermined identifier, as described herein, includes, but is not limited to, a value, a text string, or other data representable by a binary value. The element module 120 may query the application to identify the user interface elements.

In one example embodiment, the application is programmed according to a library of user interface elements. The user interface elements may include a predetermined identifier. In one example, the element module 120 may query the application whether a specific user interface elements exist with a specific predetermined identifier. Based on an affirmative response, the element module 120 determines that the application includes the predetermined user interface element. In another example, the application may notify the element module 120 regarding the user interface elements that are included in the library of user interface elements.

After determining the application based on a use metric as previously described, the element module 120 may further modify locations of user interface elements for a different application. The different application may also have been programmed according to the library of user interface elements so that the element module 120 may determine which user interface elements match user interface elements from the first application based, at least in part, on matching a predetermined identifier. In another example embodiment, the other application includes the matching user interface elements at a default location.

In one example embodiment, the element module 120 and the profile module 140 operate as a part of an operating system for a computing device. As part of the operating system, as one skilled in the art may appreciate, may allow the modules 120, 140 to access portions of the applications. The modules 120, 140, in another example embodiment, make calls to the applications to determine the user interface elements that are part of the library.

In another example, the application includes one or more function calls to update a parameter of a user interface element. In another example, the applications hands control of the user interface element to the element module 120 and the element module 120 adjusts the parameter of the user interface element.

In another example embodiment, the profile module 140 is configured to generate a profile for the user. The profiles stores, at least, respective locations of one or more user interface elements. The profile module 140 generates profiles for each user that operates the computing device executing the modules 120, 140. The various profiles may be associated with specific login credentials, authentication tokens, or the like.

In one example embodiment, the profile module 140 further transmits the generated profile for storage at a remote computing device. Therefore, in one example, the profile module 140 may download a previously generated profile from a remote server. For example, in response to a user authenticating with the computing device, the profile module 140 downloads the profile for the user and the element module 120 modifies locations of one or more user interface elements according to the profile. Therefore, the profile module 140 may generate a user profile that includes locations of one or more user interface elements, upload the profile to a remote server, and in response to the user authenticating with a different computing device, and downloads the profile to the different computing device. This allows a user's initial experience with a foreign computing device to be consistent with operation of the user's primary computing device and/or with applications operating at either computing device.

In another example embodiment, the profile module 140 adjusts the user profile based, at least in part, on common locations of user interface elements according to a group of other users. For example, in response to a majority of user profiles for other users indicating certain locations of user interface elements (based on respective user's profile), the profile module 140 updates the user profile according to the selection of the majority of other users. This provides consistent behavior of user interface components with popular trends, a general population of users, or the like. The profile module 140, in another example embodiment, confirms with the user whether or not to update the profile according to the group of people.

In one example embodiment, the user interface element is an icon used to execute the application. In another example embodiment, the profile module 140 stores an application icon for the application as part of the profile. The profile module 140 may modify the icon based, at least in part, on a selected primary purpose of the application as will be further described in FIG. 5. A primary purpose for a first application may be messaging and the profile module 140 stores the primary purpose as part of the profile for the user. In response to a second application also having a primary purpose of messaging, the element module 120 modifies the application icon to be consistent with the first application. Therefore, applications with common primary purposes may have similar or identical application icons.

Figure 13:
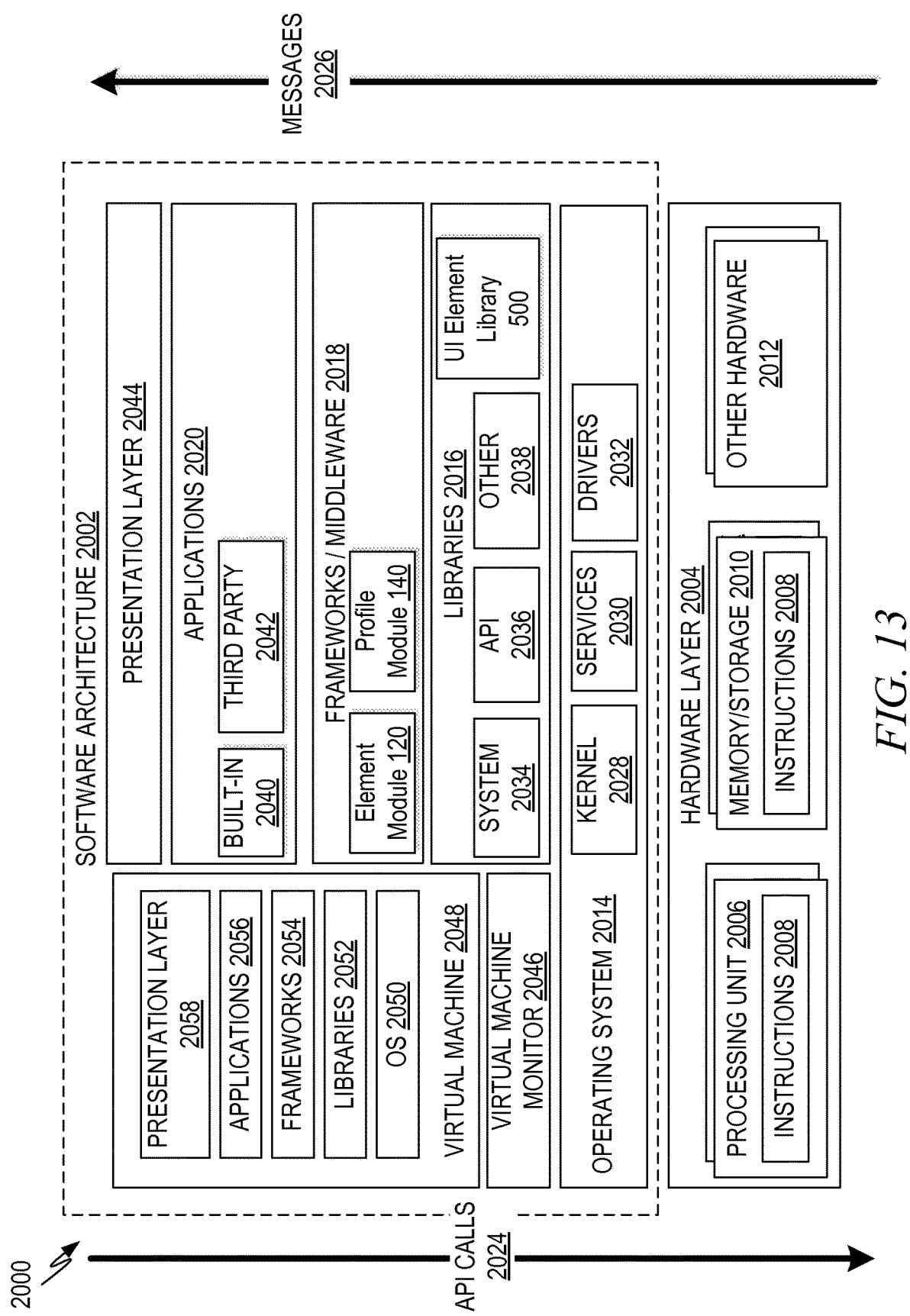
FIG. 13 is a block diagram illustrating an example of a software architecture that may be installed on a machine, according to some example embodiments.

The system 150 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize. In one embodiment, the system 150 is represented by the architecture of FIG. 13. In another embodiment, the system 150 is represented by the hardware system described in FIG. 14. In some embodiments, the system 150 may comprise a display module (not shown) to display information (e.g., in the form of user interfaces). In further embodiments, the system 150 may comprise one or more of a touch screens, accelerometers, gyroscopes, cameras, microphones, global positioning system (GPS) devices, and so forth.

Figure 3:
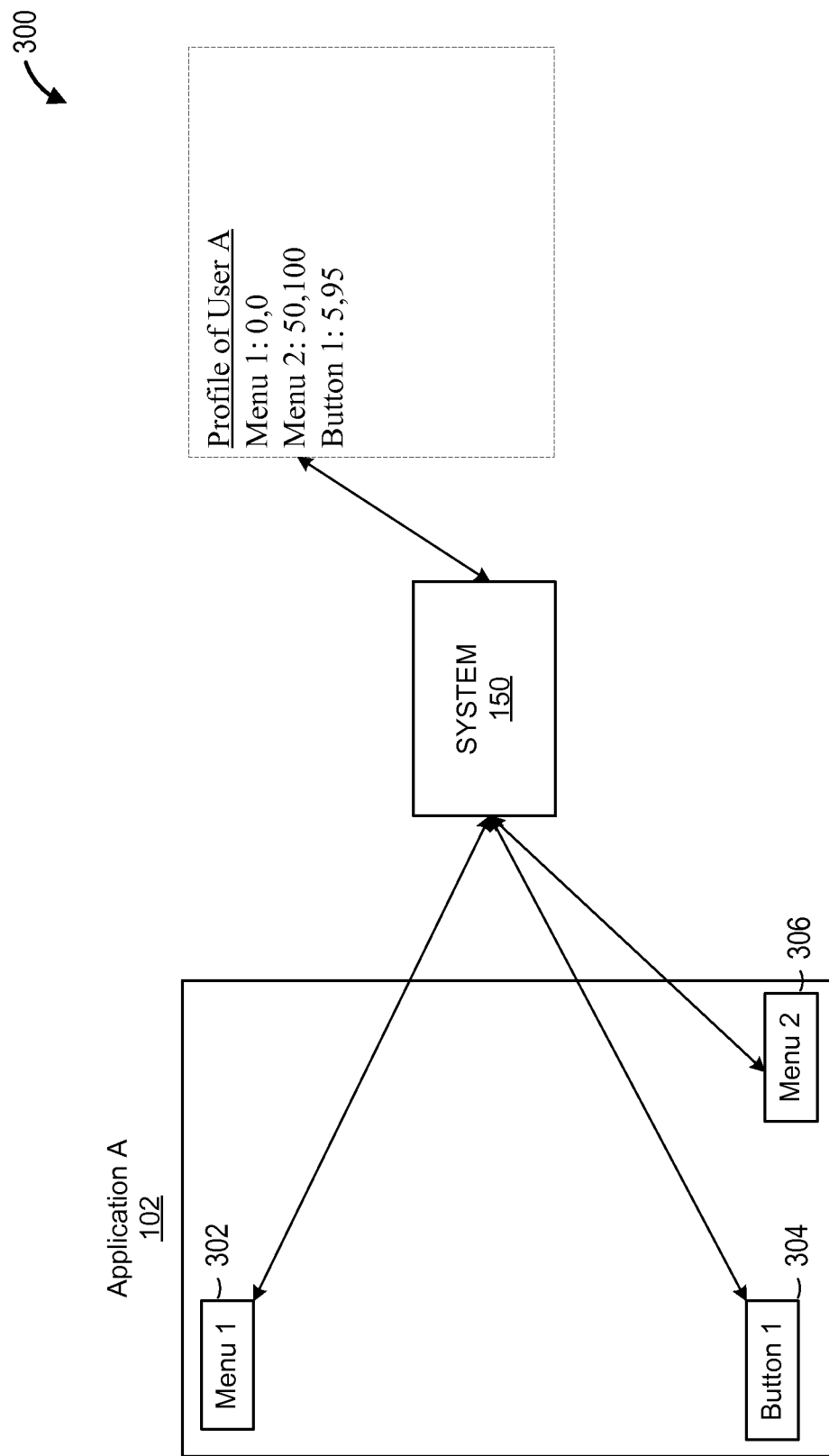
FIG. 3 is an illustration depicting a system for standardizing user interface elements according to one example embodiment.

FIG. 3 is an illustration depicting a system 300 for standardizing user interface elements according to one example embodiment. According to one example embodiment, the element module 120 selects a first application (e.g. Application A 102) based on a use metric as previously described. The profile module 140 generates a user profile that includes parameters for one or more user interface elements.

In one example, the user interface elements include a first menu 302, a second menu 306, and a button 304. The element parameters, in this example, are a location. Accordingly, the element module 120 determines the location of each of the user interface elements 302, 304, 306 and the profile module 140 generates a user profile that encapsulates the respective locations.

For example, the profile module 140 stores the respective locations in a text file. In another example, the profile module 140 stores the respective locations and/or other parameters for the user interface elements 302, 304, 306. Other element parameters include, but are not limited to, location, size, color, behavior, input, or the like. In another example, the profile module 140 stores the parameters in a binary format, uploads the parameters to a remote location for storage, or other, or the like. Of course, one skilled in the art may appreciate other ways in which such parameters may be stored and this disclosure is not limited in this regard.

In one specific example, the profile module 140 stores a location of Menu 1 as zero pixels across and zero pixels down from a top left corner of the application. The profile module 140 stores value pairs for the other user interface controls 304, 306 to indicate a Cartesian coordinate as one skilled in the art may appreciate. Of course, other systems may indicate a location and this disclosure is not limited in this regard.

Figure 4:
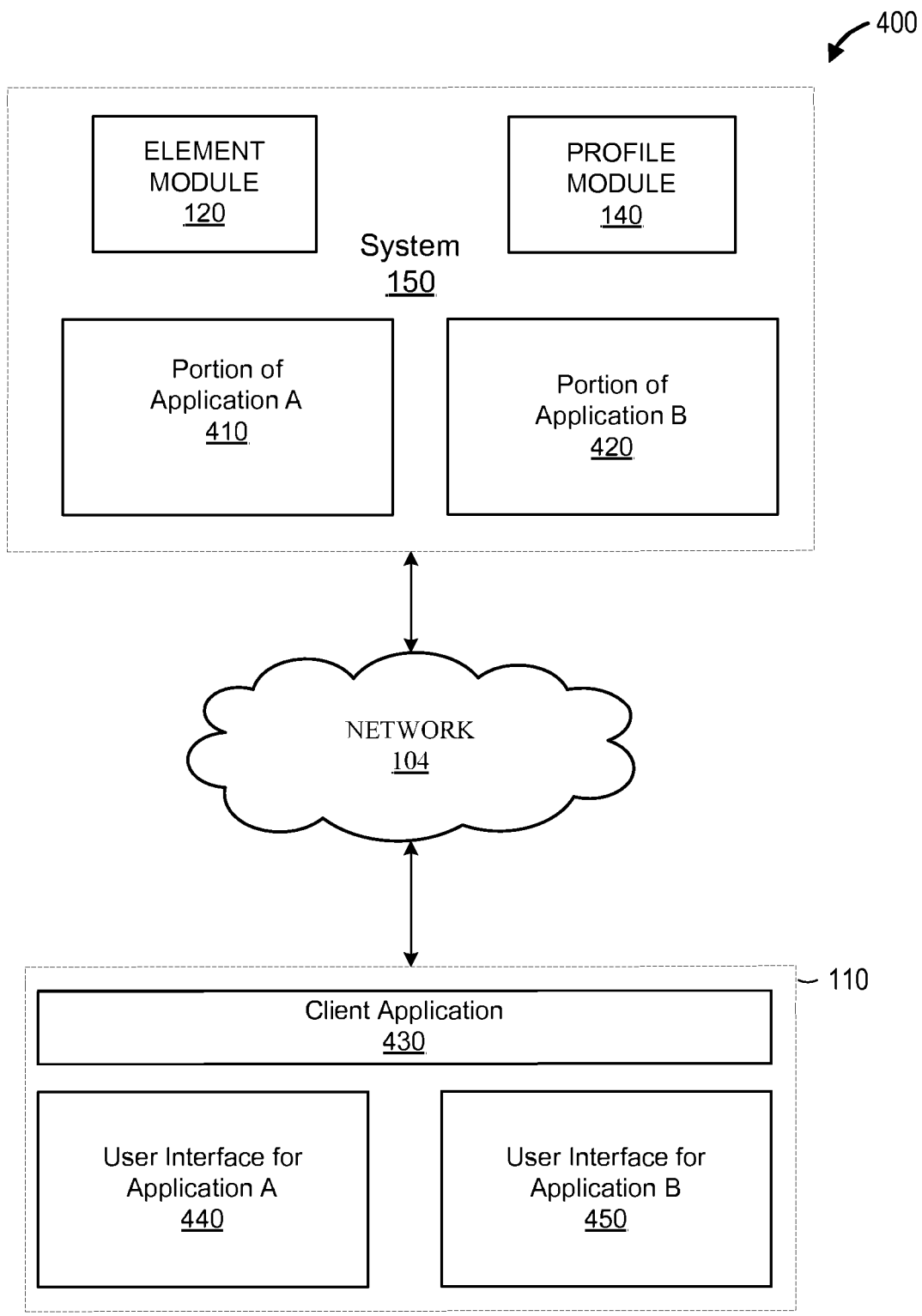
FIG. 4 is a schematic block diagram illustrating a networked user interface according to one example embodiment.

FIG. 4 is a schematic block diagram illustrating a networked user interface according to one example embodiment 400. According to this example embodiment, the Application A 102 and the Application B 103 may, at least partially, operate on a remote system.

In one example embodiment, the system 150 includes the element module 120, the profile module 140, a portion 410 of Application A 102 and a portion 420 of Application B 103. The system 150 communicates across a network 104 to a client application 430 that may present a user interface 440 for Application A 102 and a user interface 450 for Application B 103.

Therefore, the element module 120 may determine respective parameters of user interface elements although the user interface elements may be presented at a remote system. For example, the User Interface 440 may communicate parameters for user interface elements to the elements module 120 over the network 104. Furthermore, the element module 120 may command user interface elements in the user interface 450 for Application B 103 to move or change in other ways according to one or more parameters stored in the user profile and/or as described herein. Accordingly, the Application A 102 and/or the Application B 103 may operate in a client/server architecture as one skilled in the art may appreciate. In another example embodiment, the client application 430 is a web browser and manages user interface elements for the respective applications 102, 103. In another example, the Applications 102, 103 is a cloud based application as one skilled in the art may appreciate, and respective portions 410, 420, 440, 450 operate on different computing devices and communicate over the network 104.

For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate across the network 104, on an as needed basis, for data and/or processing capabilities not locally available (e.g., access to a database of items available for sale, to authenticate a user, to verify a method of payment, etc.).

One or more users 106 may be a person, a machine, or other means of interacting with the system 150. In example embodiments, the user is not part of the system 150, but may interact with the system 150. For instance, the user provides input (e.g., touch screen input or alphanumeric input) to the system 150 and the input is communicated to the respective modules via the network 104.

FIG. 5 is an illustration depicting predefined user interface elements as part of a user interface (UI) element library 500 for standardizing user interface elements according to one example embodiment. As one skilled in the art may appreciate, a library includes, but is not limited to, executable code for identifying predefined elements and/or performing a standardized set of operations. The library 500 includes one or more predefined user interface elements as well as functions that support modifying user interface element parameters as described herein. Modifiable parameters of the interface elements include, but is not limited to, color, size, width, height, position, font, font size, or other, or the like.

In one example embodiment, the library 500 includes one or more predefined menus. For example, the library 500 may include a primary menu, a secondary menu, a context menu, an extra menu, or the like. Of course, this disclosure is not limited in this regard and the library 500 may include any number of menus. Each of the menus may be include a predefined identifier so that the element may be identified by the element module 120.

In another example, the library 500 includes one or more predefined buttons. For example, the library 500 may include an affirm button, a yes/no button, and/or other buttons (e.g. Button 4, Button 5, etc.). According to one example embodiment, a first application is programmed using the yes/no button in the library 500, and a second application is programmed using the yes/no button in the library 500. In response to the user using the first application as a higher frequency than the second application, the element module 120 may adjust one or more parameters in the yes/no button in the second application based on parameters in the yes/no button in the first application. Therefore, a user using both the first application and the second application experiences similar behavior for yes/no buttons.

A yes/no button, as described herein, includes at least, a request to the user to select either an affirmative or a negative response. The yes/no button may include two buttons, one with a "yes" indication and one with a "no" indication. In another example, the yes/no button includes a "thumbs up" for an affirmative response, and a "thumbs down" for a negative response. Of course, one skilled in the art may recognize other ways to request a binary selection from the user and this disclosure is not limited in this regard.

In another example embodiment, the library 500 includes predefined drop down boxes, DDB 1 and DDB2. Of course, the library may include may other drop down boxes and this disclosure is not limited in this regard. The library 500, in another example embodiment, includes tabs, scrollbars, labels, check boxes, radio buttons, icons, cursors, an application purpose, or other, or the like. The various user interface elements and/or functions depicted in FIG. 5 are for illustrative purposes only and are not limiting in any way. Of course, the library 500 may include many more, even hundreds or thousands of user interface elements and/or function calls.

As applications are developed using the library 500, the element module 120 may adjust parameters for the user interface elements in separate and distinct applications. For example, the element module 120 may call a "moveElement (location)" function defined in the library to move an element. Such modifications make a user's experience more consistent across many different applications, even application that have been separately designed and/or developed. Specifically, several different applications may implement dozens of the user interface elements and the element module 120 may make the interface components behave similarly between the different applications.

In one example embodiment, the library 500 is provided to application developers for inclusion in developed applications. The library 500 may further include one or more methods that may be callable by the element module 120 to determine user interface elements and/or parameters. In one example, one method call may allow the element module 120 to determine whether the application has been developed including the library 500. Based on an affirmative response, the element module 120 performs its respective functions as described herein. Another method, in one example, includes a method that allows the element module 120 to retrieve parameters for an element (e.g. one of the predefined elements included in the application).

In another example, a method allows the element module 120 to retrieve a list of user interface elements that are part of the library 500. For example, the element module 120 may make this call to receive a list of elements that are part of the library 500 and are included in the application.

In one example embodiment, the library 500 includes a set of predefined application functions. In one example, an application function includes "take a picture," and an application developer may implement the function in a variety of different ways as further described in FIG. 6. Although the application functions depicted in FIG. 5 include, "share," "make a call," "scroll," "send to trash," "refine search," "screen shot," and "take a picture," the application functions are limited in this way and may include any application functions as one skilled in the art may appreciate.

In another example embodiment, the library 500 may define a standard of user interface elements and the system 150 may provide documentation of the standard to application developers. The system 150 may also provide a software development kit (SDK) for developers. Furthermore, the library may include a version number so that as the library 500 grows, the system 150 may interact with the library based, at least in part, on the version number.

Figure 6:
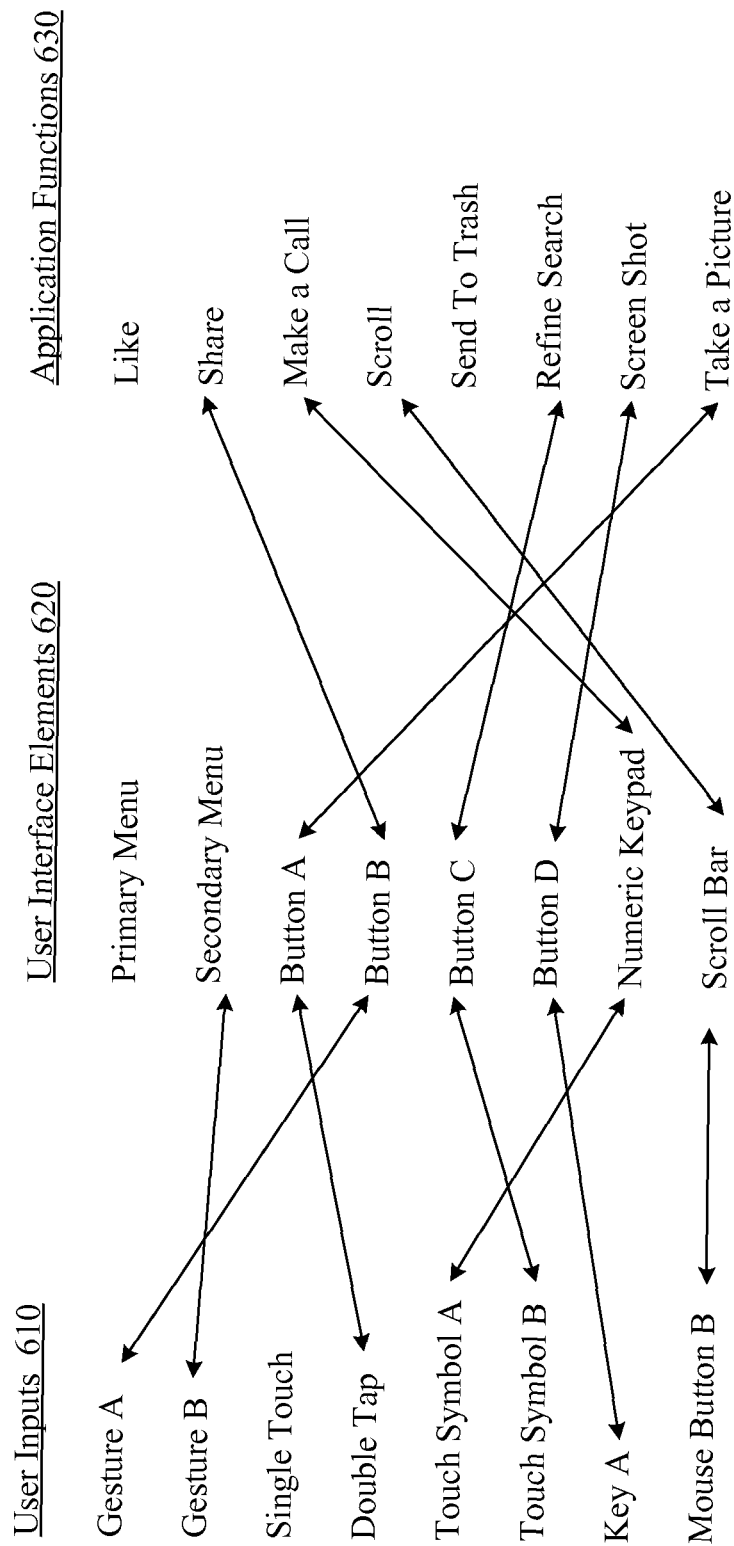
FIG. 6 is an illustration depicting one example embodiment of inputs associated with user interface elements.

FIG. 6 is an illustration depicting one example embodiment 600 of one or more inputs associated with user interface elements. In one example embodiment, a parameter of a user interface element includes an associated input and an associated application function. Of course, it is not necessary that all user interface elements are associated with either inputs or commands. Furthermore, it is also not necessary that a user interface elements is associated with both a user input and an application function, but may be associated with one or the other.

Figure 14:
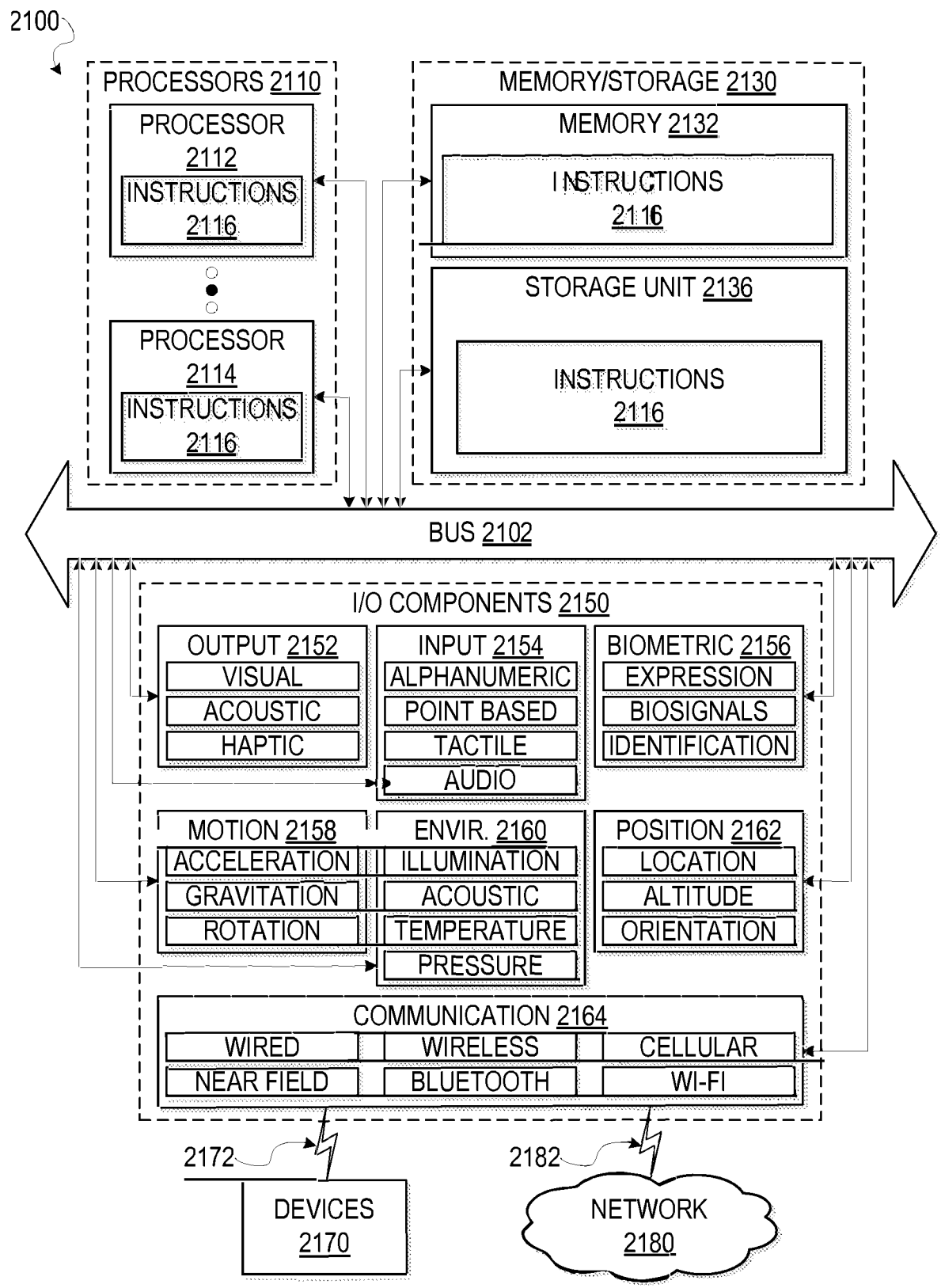
FIG. 14 illustrates a diagrammatic representation of a machine in the form of a computer system within which a set of instructions may be executed for causing the machine to perform any one or more of the methodologies discussed herein, according to an example embodiment.

User inputs 610 include, but are not limited to, gestures, mouse movements, keyboard entries, touchscreen touches, a wireless signal, a network transmission, or any other input detectable by an input component as described in FIG. 14. Furthermore, application functions 630 include and segment or portion of executable code that, as part of an application, perform one or more commands. In certain examples, an application function includes at least one of, to like something, to share something, to make a call, to scroll something up and or down, to delete something, move something, move something to a trash, to refine a search, to take a screen shot, to take a picture, or any other application function as one skilled in the art may appreciate.

In one example embodiment, the element module 120 associates a user input 610 with an application function by associating a predefined interface element (e.g. a predefined interface element in the library 500) with both the user input 610 and the application function 630. Thus, the predefined user interface element 620 links the user input 610 with the application function 630. For example, user interface element Button B is associated with user input Gesture A. Furthermore, Button B is associated with a "share" application function. Thus, the element module 120, upon receipt of Gesture A by an input component of the system performs the "share" application function.

In another example, as depicted in FIG. 6, Gesture B is associated with the Secondary Menu user interface element 620. Therefore, upon receipt of Gesture B, the element module 120 selects and/or activates the secondary menu user interface control. Of course, any user input 610 may be associated with any user interface element 620 and this disclosure is not limited in this regard. Furthermore, any of the user interface elements 620 may be associated with any application function 630 and this disclosure is also not limited in this regard. Therefore, in certain examples, user inputs 610 are linked with application function such that receipt of the user input causes the system 150 to perform the associated application function 630.

In one example embodiment (not depicted in FIG. 6), the user interface element Button X is associated with a user touch input "swipe right" and also associated with the a general application function "forward." Therefore, in response to detecting a "swipe right," the system 150 commands the application to perform the "forward" function. Of course, a first application may implement "forward" differently than a second application.

In one example, a first application may be for viewing an array of images and may implement "forward" to move to a next picture. A second application may be for viewing a video and may implement "forward" as playing the video forwards. Therefore, because a user may learn that "swipe right" implements the "forward" function from a first application, the user may use another application that implements the "forward" function differently, and the user need not learn a different input to cause the application to perform the forward function. Because one or more application functions are identified in a library 500 of application functions, users may experience more consistent interfaces with various applications, and will need less time learning a new application.

In another specific example, the user interface element Button A is associated with the user input "double tap" and also associated with the application function "take a picture." Therefore, in response to detecting a "double tap," the system 150 takes a picture. A first application may implement "take a picture" differently than a second application.

For example, a first application may be for social media and may implement "take a picture" as taking a picture using a user facing camera. The first application perhaps assumes that the user desires to take a selfie as opposed to an image that may be more directed outwards. A second application may be an image capture application and perhaps assumes that user would prefer to use a front camera. Therefore, because the first application assigns "take a picture" to take a picture from a user facing camera, and the second application assigns the application function "take a picture" to take a picture from a rear facing camera, a user may a double tap to take a picture from either application and the applications may function differently.

In another example embodiment, the profile module 140 stores the various associations as one skilled in the art may appreciate. Therefore, the profile may be loaded based on a user using the system 150. For example, in response to a user authenticating with the system 150, the profile module 140 may load a profile for that user.

In one example embodiment, the profile module 140 requests associations from the user. For example, the profile module 140 may ask the user which input to assign to which user interface element, or which user interface element to assign to which application function. The profile module 140 may present the user with a range of selections as one skilled in the art may appreciate.

Figure 7:
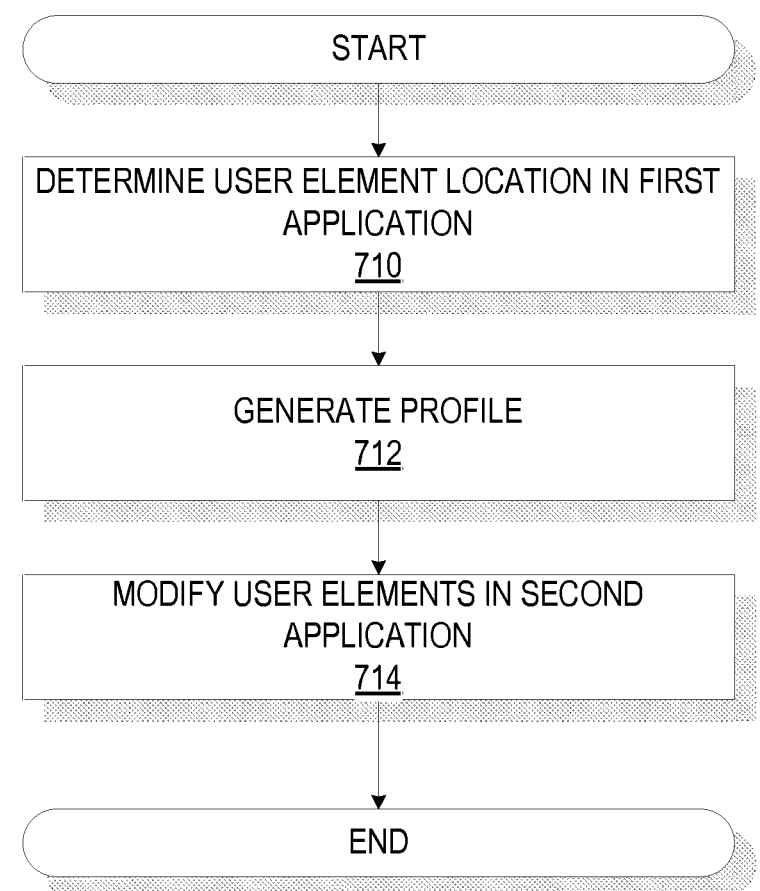
FIG. 7 is a flow chart diagram illustrating a method for standardizing user interface elements according to one example embodiment.

FIG. 7 is a flow chart diagram illustrating a method 700 for standardizing user interface elements according to one example embodiment. Operations in the method 700 may be performed by the system 150, using modules described above with respect to FIGS. 2, 4. As shown in FIG. 7, the method 700 includes operations 710, 712, and 714.

In one embodiment, the method 700 may begin and at operation 710 the element module 120 determines parameters of one or more user interface elements as part of a first application. The elements may include a predetermined identifier according to a library of user interface elements. Furthermore, the first application may be selected based on increased usage according to a use metric as described herein.

The method 700 may continue at operation 712 and the profile module 140 generates a profile for the user. The profile may include the respective parameters of the one or more user interface elements. The method 700 continues at operation 714 and the element module 120 modifies parameters of one or more user interface elements with matching predetermined identifiers as part of a second application based on the respective locations indicated in the profile.

Figure 8:
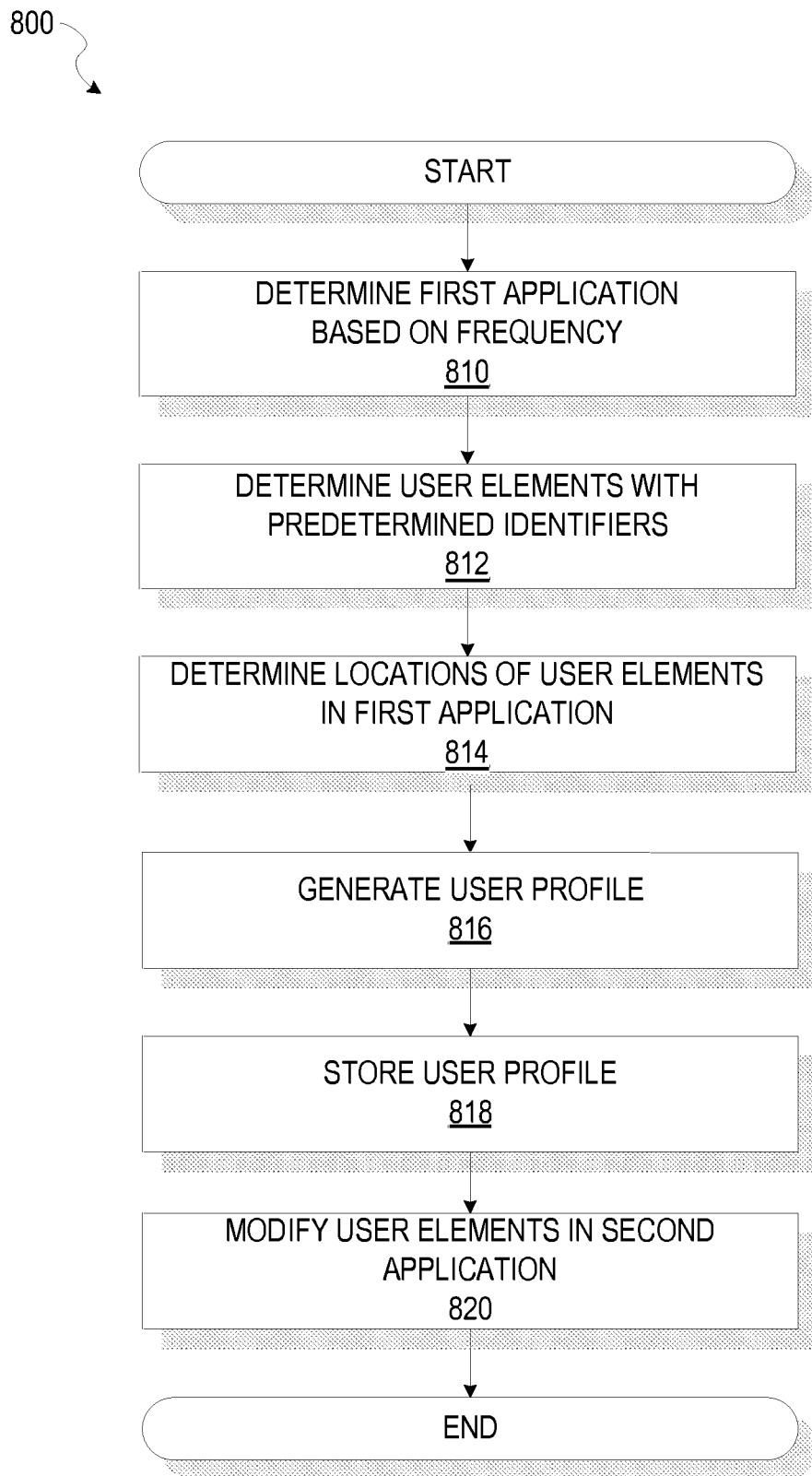
FIG. 8 is a flow chart diagram illustrating one method for standardizing user interface elements according to one example embodiment.

FIG. 8 is a flow chart diagram illustrating one method for standardizing user interface elements according to one example embodiment. Operations in the method 800 may be performed by the system 150, using modules described above with respect to FIGS. 2, 4. As shown in FIG. 8, the method 800 includes operations 810, 812, 814, 816, 818, and 820.

In one embodiment, the method 800 begins and at operation 810 the element module 120 selects a first application executing, at least partially, on the system 150. The element module 120 selects the first application based on a use metric indicating increased use by a user of the system 150. The method 800 continues at operation 812 and the element module 120 determines one or more user interface elements with predetermined identifier according to a library of user interface elements. The method continues at operation 814 and the element module 120 determines one or more parameters of the user interface elements. For example, the element module 120 may determine position, location, color, size, font, font property, or any other property of the user interface element.

The method 800 continues at operation 816 and the profile module 140 generates a user profile that includes the parameters of the user interface elements. The method 800 continues at operation 818 and the profile module 140 stores the profile. In one example, the profile module 140 may store the profile on a local storage device as described in FIG. 13. In another example, the profile module 140 stores the profile by transmitting the profile to a remote system for storage. The method 800 continues at operation 820 and the element module 120 modifies parameters of one or more user interface elements with matching predetermined identifiers as part of a second application based on the respective parameters indicated in the profile.

Figure 9:
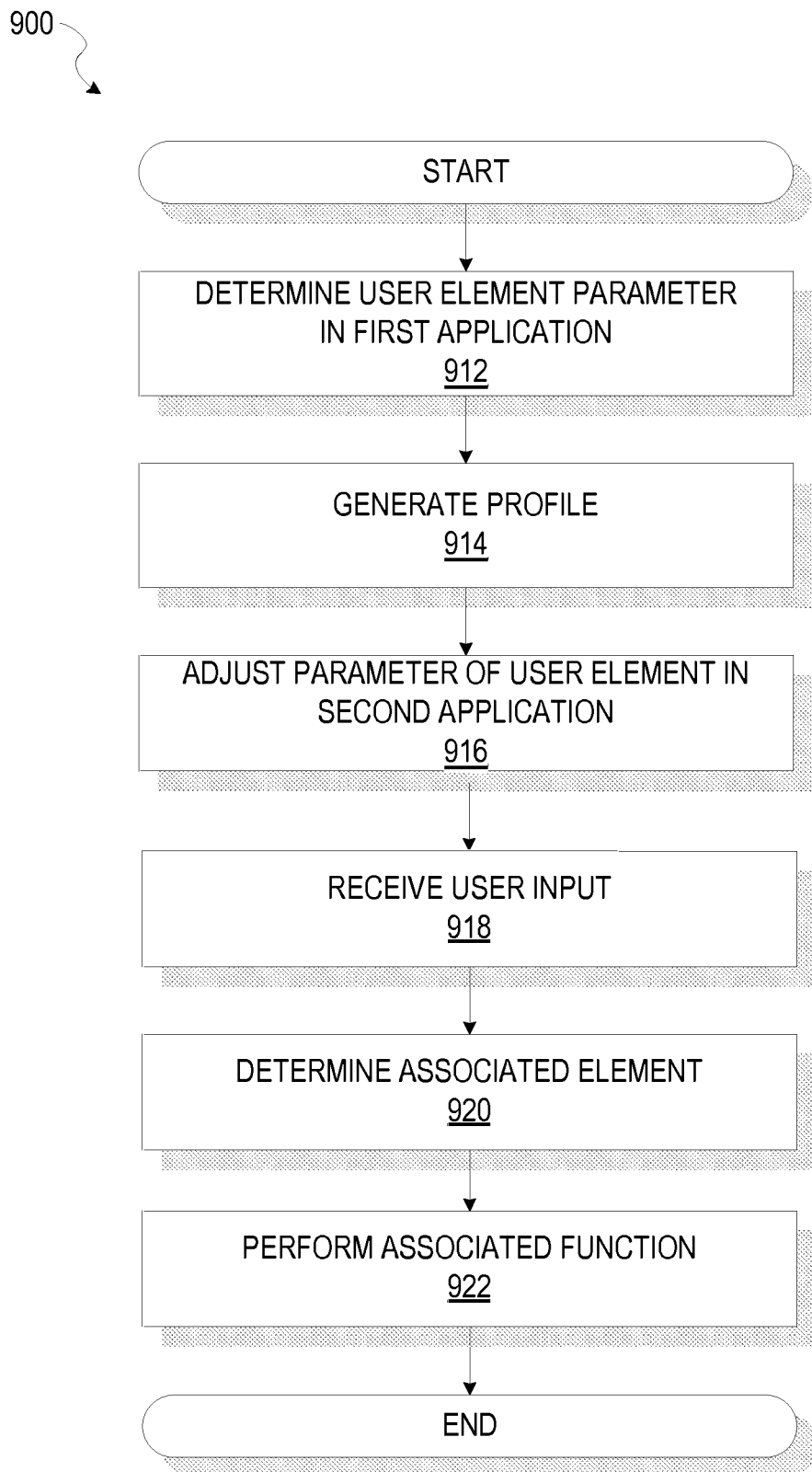
FIG. 9 is a flow chart diagram illustrating one method for associating an input with a user interface elements according to one example embodiment.

FIG. 9 is a flow chart diagram illustrating one method 900 for associating an input with a user interface elements according to one example embodiment. Operations in the method 900 may be performed by the system 150, using modules described above with respect to FIGS. 2, 4. As shown in FIG. 9, the method 900 includes operations 912, 914, 916, 918, 920, and 922.

According to one example embodiment, the method 900 begins and at operation 912 the element module 120 determines a parameter of a user interface element as part of a first application executing at the system 150. The method 900 continues at operation 914 and the profile module 140 generates a profile that includes the parameter of the user interface element.

The method 900 continues at operation 916 and the element module 120 modifies parameters of one or more user interface elements with matching predetermined identifiers as part of a second application based on the respective parameters indicated in the profile. For example, the user may move the user interface element and the element module 120 updates the position of the user interface element in response to the user's action. The method continues at operation 918 and the element module 120 receives input from the user that is associated with the user interface element. The method 900 continues at operation 920 and the profile module 140 determines the associated element. The method 900 continues at operation 922 and the element module 120 commands the application to perform an application function that is associated with the user interface element.

In one example, the profile stores an association between a key input of '-' and the user interface element. The profile may further store an association between the user interface element and an application function "refresh." Therefore, in response to receiving '-' key at operation 918, and determining the associated element, the element module 120 instructs the application to perform the "refresh" associated function and/or command.

Figure 10:
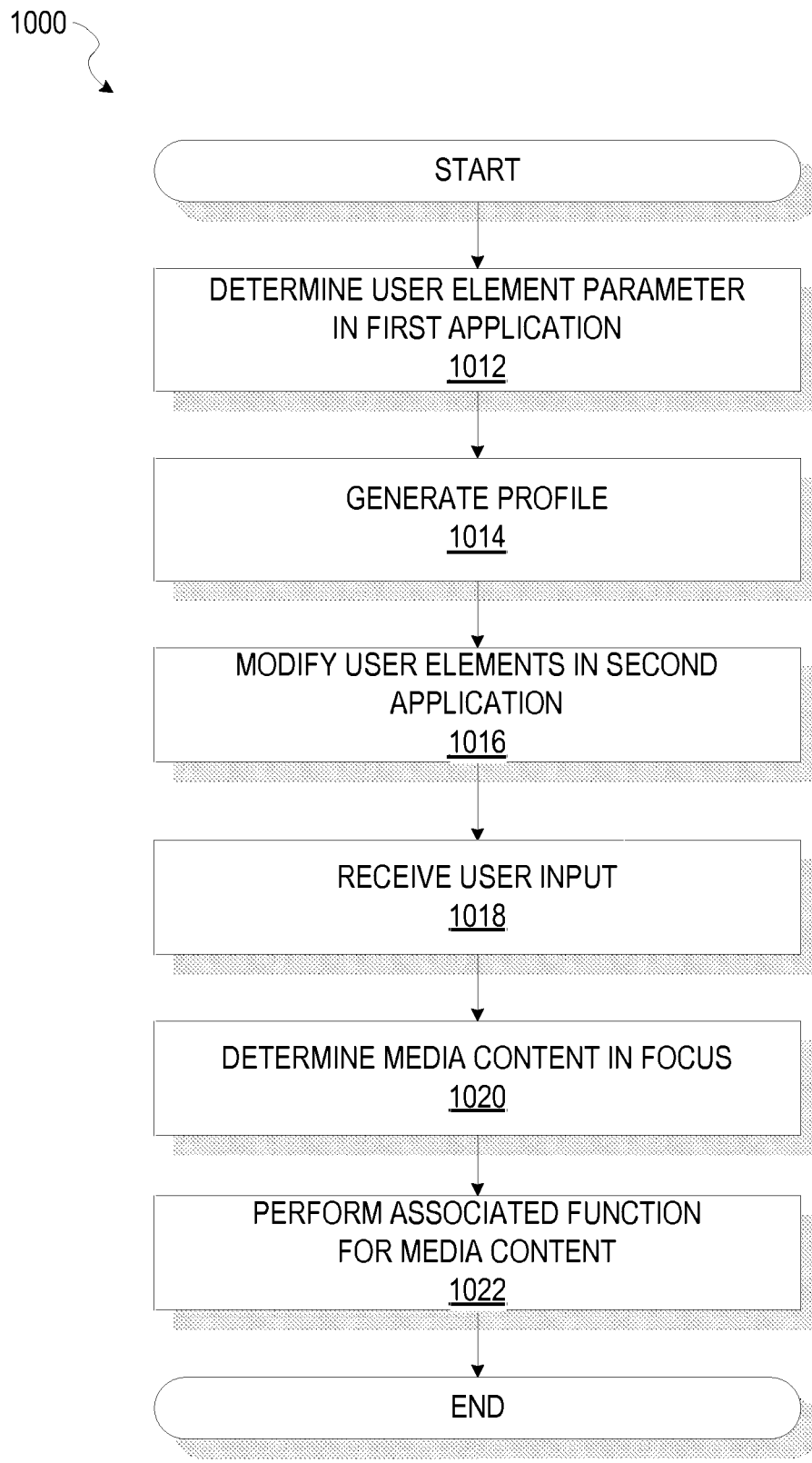
FIG. 10 is a flow chart diagram illustrating one method for standardizing user inputs based on a media type according to one example embodiment

FIG. 10 is a flow chart diagram illustrating one method 1000 for standardizing user inputs based on a media type according to one example embodiment. Operations in the method 1000 may be performed by the system 150, using modules described above with respect to FIGS. 2, 4. As shown in FIG. 10, the method 1000 includes operations 1012, 1014, 1016, 1018, 1020, and 1022.

According to one example, the method 1000 begins and at operation 1012 the element module 120 determines a parameter of a user interface element as part of a first application executing at the system 150. The method 1000 continues at operation 1014 and the profile module 140 generates a profile that includes the parameter of the user interface element.

The method 1000 continues at operation 1016 and the element module 120 modifies parameters of one or more user interface elements with matching predetermined identifiers as part of a second application based on the respective parameters indicated in the profile. The method 1000 continues at operation 1018 and the system 150 receives input from a user. The input may include, but is not limited to, a touch, an audio signal, a network transmission, a gesture, a key input, a button, a mouse input, or other input described in FIG. 14, or the like.

The method 1000 continues at operation 1020 and the profile module 140 determines a type of media content for an application receiving the input. For example, where a still image is in focus for the application the media type is a still image. In another example, the application may be a video editing application and the media type is a video. Of course, the profile module 140 may determine any other media type and this disclosure is not limited in this regard. The method 1000 continues at operation 1022 and the profile module 140 commands the application to perform the application function associated with the media content as previously described.

Figure 11:
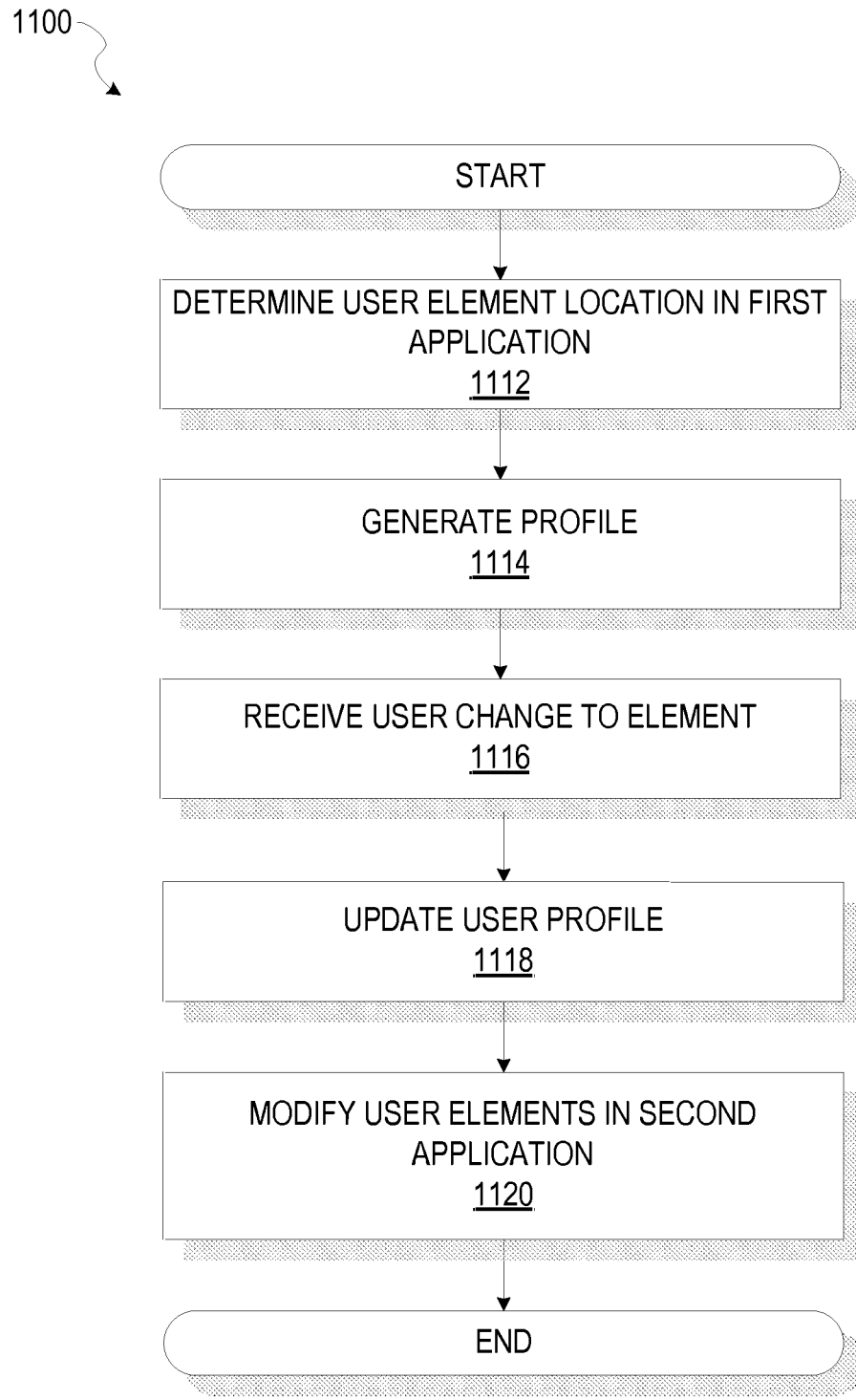
FIG. 11 is a flow chart diagram illustrating one method for standardizing user interface elements according to one example embodiment.

FIG. 11 is a flow chart diagram illustrating one method 1100 for standardizing user interface elements according to one example embodiment. Operations in the method 1100 may be performed by the system 150, using modules described above with respect to FIGS. 2,4. As shown in FIG. 11, the method 1100 includes operations 1112, 1114, 1116, 1118, and 1120.

According to one example, the method 1100 begins and at operation 1112 the element module 120 determines a parameter of a user interface element as part of a first application executing at the system 150. The method 1100 continues at operation 1114 and the profile module 140 generates a profile that includes the parameter of the user interface element.

The method 1100 continues at operation 1116 and the element module 120 receives a notification that the user has changed a parameter of the user interface element. For example, the user may move the user interface element, and the application notifies the element module 120 that the location parameter has changed. In another example, the user changes a size of the user interface element and the application notifies the element module 120 that the size of the user interface element has changed. According to this example embodiment, the element module 120 requests that the application notifies the element module 120 in response to the user changing a parameter of the user interface element. Furthermore, the element module 120 may request that the application notify the element module 120 in response to the user changing any of the user interface elements defined in a library of predetermined user interface elements.

The element module 120 may receive notification from the application in a wide variety of ways as one skilled in the art may appreciate. For example, the application may send a message, store a flag in memory and/or storage, call a function, such as a notification function, or other, or the like.

The method 1100 continues at operation 1118 and the profile module 140 updates the user profile according to the change in the user interface element. Therefore, as the user modifies the various user interface elements, the profile module 140 keeps the profile up-to-date. The method 1100 continues at operation 1120 and the element module 120 modifies parameters of one or more user interface elements with matching predetermined identifiers as part of a second application based on the respective parameters indicated in the profile.

Therefore, according to one example embodiment, a user may frequently use a first application. As the user makes changes to user interface elements in the first application, the profile module 140 maintains and updates the profile for the user. In response to the user executing a second application that may be less frequently used, the element module 120 adjusts and/or modifies parameters of predefined user interface controls according to the parameters of the user interface controls in the first application. This provides a more consistent interface for the user.

In another example embodiment, the profile module 140 further stores manual user modifications to an interface element and the element module 120 does not modify a parameter for an interface element that is inconsistent with a manual user modification stored in a user profile. For example, although the element module 120 applies interface element parameters from a first application to a second application, in response to a profile for the user storing specific parameters for an interface element in the second application, the element module 120 does not apply the parameters for the interface element according to the first application.

Figure 12:
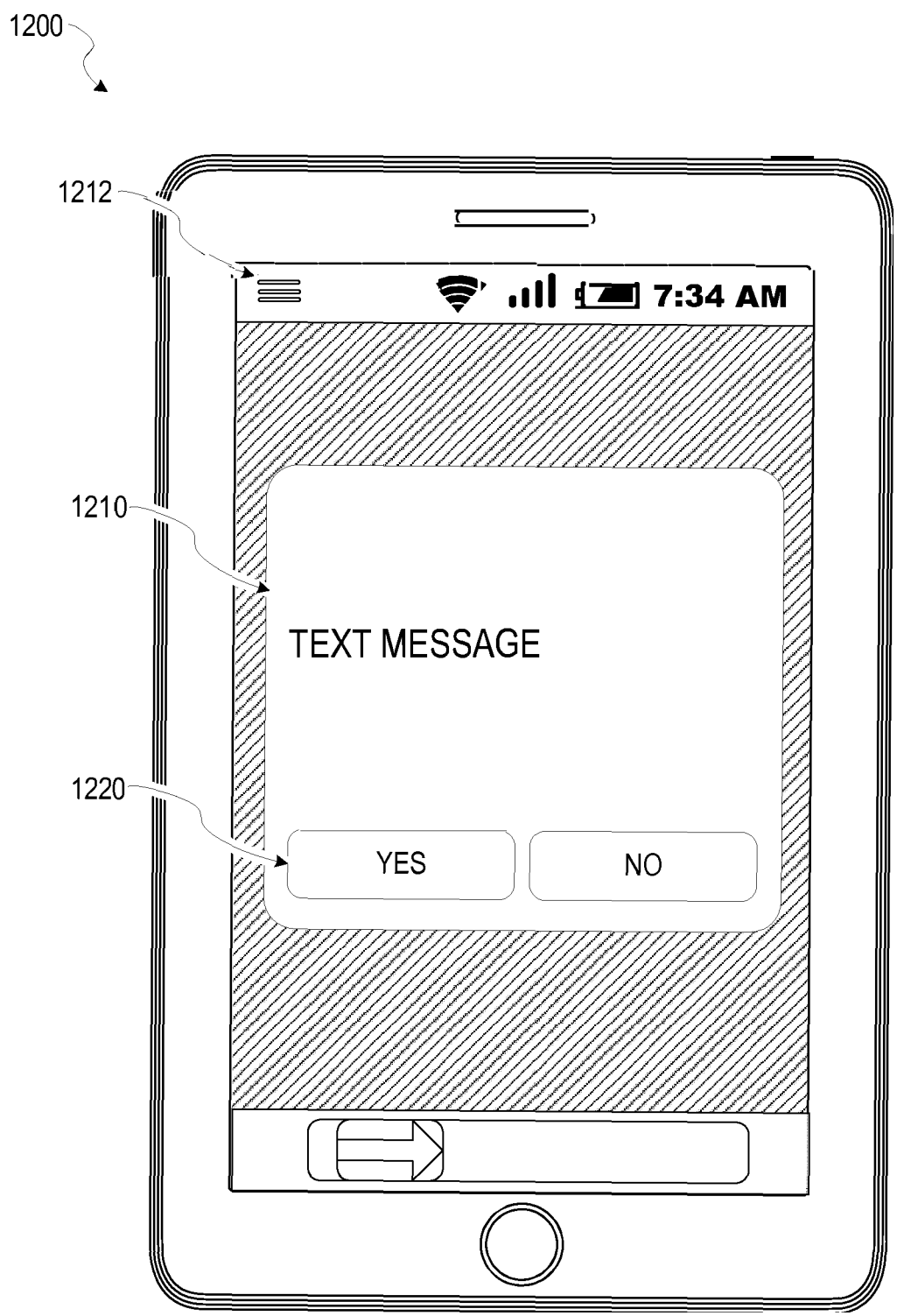
FIG. 12 is an illustration depicting a user interface according to one example embodiment.

FIG. 12 is an illustration depicting a user interface 1200 according to one example embodiment. The user interface 1200 includes a primary menu user interface element 1212, a text window 1210, and a yes/no question element. The menu 1212 user interface element is represented as a button to the user and also includes an icon recognizable by the user as a primary menu.

According to certain embodiments, an application that generates the user interface 1200 is programmed according to a predetermined library of user interface elements. The elements 1212, 1210, and 1220 include predetermined identifier so that the element module 120 may identify the user interface elements. In this example interface 1200, the primary menu user interface element 1212 is placed at an upper left corner of the application. Therefore, in response to a user starting a different application, the element module 120 may move the primary menu to an upper left corner of the different application.

Additionally, it may not be necessary that the different application specify a location or other parameter for the primary menu user interface element 1212 because the element module 120 may adjust the location according to parameters associated with the primary menu user interface element for the first application.

In another example embodiment, the application is programmed using a yes/no button 1220 as described in FIG. 5. It is not necessary that the application specify specific parameters of the yes/no button 1220 because the element module 120 adjusts the parameters of the yes/no button 1220 according to a profile stored for the user. Accordingly, the application merely requests that the yes/no button 1220 be displayed per programming and the element module 120 determines where and how to display the yes/no button 1220. The text box 1210 may be similarly programmed in the application the displays the user interface 1200.

Therefore, a user may primarily use a primary application and the element module 120 determines parameters of predefined user interface elements as part of the primary application. As the user uses a secondary application, the element module 120 may adjust user interface elements to be consistent with the primary application. Therefore, a user need not learn a new application interface because the element module 120 makes the interfaces similar Machine and Software Architecture The modules, methods, applications and so forth described in conjunction with FIGS. 1-12 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

FIG. 13 is a block diagram illustrating an example of a software architecture 2000 that may be installed on a machine, according to some example embodiments. The software architecture 2000 may be used in conjunction with various hardware architectures herein described. FIG. 13 is merely a non-limiting example of a software architecture and it will be appreciated that many other architectures may be implemented to facilitate the functionality described herein. The software architecture 2000 may be executing on hardware such as machine 2100 of FIG. 14 that includes, among other things, processors 2110, memory 2130, and I/O components 2150. A representative hardware layer 2004 is illustrated and can represent, for example, the machine 2100 of FIG. 14. The representative hardware layer 2004 comprises one or more processing units 2006 having associated executable instructions 2008. Executable instructions 2008 represent the executable instructions of the software architecture 2002, including implementation of the methods, modules and so forth of FIGS. 2-11. Hardware layer 2004 also includes memory and/or storage modules 2010, which also have executable instructions 2008. Hardware layer 2004 may also comprise other hardware as indicated by 2012 which represents any other hardware of the hardware layer 2004, such as the other hardware illustrated as part of machine 2100.

In the example architecture of FIG. 13, the software 2002 may be conceptualized as a stack of layers where each layer provides particular functionality. For example, the software 2002 may include layers such as an operating system 2014, libraries 2016, frameworks/middleware 2018, applications 2020 and presentation layer 2022. Operationally, the applications 2020 and/or other components within the layers may invoke application programming interface (API) calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules. In one specific, the library 500 described in FIG. 5 is implemented as one of the libraries 2016.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform.

In one specific example, the element module 120 and the profile module 140 are implemented as a framework and/or middleware 2018. Therefore, the applications 2020 may communicate with the modules 120, 140 via an API, or other way as one skilled in the art may appreciate. Because the modules 120, 140 operate as middleware, in certain embodiments, they may communicate with many different applications 2020 concurrently or asynchronously. This allows the modules 120, 140 to determine parameters of user interface elements as part of one application and correspondingly modify parameters of user interface elements as part of another application. In another example, the applications 2020 may transmit parameters for user interface elements to the element module 120 and/or may request parameters from the profile module 140.

In another example, the element module 120 and the profile module 140 operate as a library 2016 and/or as part of an operating system 2014 of executable code that is callable by an appropriately programmed application as described herein.

The applications 2020 include built-in applications 2040 and/or third party applications 2042. Examples of representative built-in applications 2040 may include, but are not limited to, a contacts application, a browser application, a book reader application, a location application, a media application, a messaging application, and a game application, or other, or the like. Third party applications 2042 may include any of the built in applications as well as a broad assortment of other applications. In a specific example, the third party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2042 may invoke the API calls 2024 provided by the mobile operating system such as operating system 2014 to facilitate functionality described herein. In a further example, one of the applications 2020 is developed using the UI element library 500.

The applications 2020 may utilize built in operating system functions (e.g., kernel 2028, services 2030 and/or drivers 2032), libraries (e.g., system 2034, APIs 2036, and other libraries 2038), frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures utilize virtual machines. In the example of FIG. 13, this is illustrated by virtual machine 2048. A virtual machine creates a software environment where applications/modules can execute as if they were executing on a hardware machine (such as the machine of FIG. 14, for example). A virtual machine is hosted by a host operating system (operating system 2014 in FIG. 14) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 and/or presentation layer 2058. These layers of software architecture executing within the virtual machine 2048 can be the same as corresponding layers previously described or may be different. Of course, the libraries 2052 of the virtual machine 2048 may also include the UI element library 500 and applications 2056 executing via the virtual machine 2048 may implement the library 500 as described in FIG. 5.

EXAMPLE MACHINE ARCHITECTURE AND MACHINE-READABLE MEDIUM

FIG. 14 is a block diagram illustrating components of a machine 2100, according to some example embodiments, able to read instructions from a machine-readable medium (e.g., a machine-readable storage medium) and perform any one or more of the methodologies discussed herein. Specifically, FIG. 14 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed.

For example the instructions may cause the machine to execute the flow diagrams of FIGS. 7-11. Additionally, or alternatively, the instructions may implement the element module 120 and the profile module 140 of FIGS. 2,4, and so forth. The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 14 shows multiple processors, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 14. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e g, hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172 respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method implemented by a computing device comprising:
    receiving a user profile that comprises a first location of a first user interface element of a first application, the first user interface element configured to perform a function;
    receiving an indication of the first user interface element being moved to a second location;
    changing the user profile to include the second location rather than the first location;
    determining that a second user interface element of a second application performs the function;
    determining that a third location of the second user interface element of the second application is different from the second location of the first user interface element of the first application in the user profile; and
    in response to determining that the second user interface element of the second application performs the function, moving the second user interface element of the second application to be consistent with the second location of the first user interface element of the first application in the user profile.

2. The method of claim 1, wherein the first user interface element of the first application is an icon used to execute the function.

3. The method of claim 1, wherein the user profile is associated with login credentials or authentication tokens.

4. The method of claim 1, wherein moving the second user interface element of the second application further comprises moving the second user interface element to match the second location of the first user interface element of the first application in the user profile.

5. The method of claim 1, further comprising:
    changing the user profile to include a fourth location rather than the second location based on a positioning of the first user interface element of the first application selected by other users; and
    moving the second user interface element to be consistent with the fourth location of the first user interface element of the first application in the user profile.

6. The method of claim 1, wherein moving the second user interface element of the second application does not interfere with other user interface elements of the second application.

7. A system comprising:
    a memory component; and
    a processing device coupled to the memory component, the processing device to perform operations comprising:
        receiving a user profile that comprises a first location of a first user interface element of a first application, the first user interface element configured to perform a function;
        receiving an indication of the first user interface element being moved to a second location;
        changing the user profile to include the second location rather than the first location;
        determining that a second user interface element of a second application performs the function;
        determining that a third location of the second user interface element of the second application is different from the second location of the first user interface element of the first application in the user profile; and
        in response to determining that the second user interface element of the second application performs the function, moving the second user interface element of the second application to be consistent with the second location of the first user interface element of the first application in the user profile.

8. The system of claim 7, wherein the first user interface element of the first application is an icon used to execute the function.

9. The system of claim 7, wherein the user profile is associated with login credentials or authentication tokens.

10. The system of claim 7, wherein moving the second user interface element of the second application further comprises moving the second user interface element to match the second location of the first user interface element of the first application in the user profile.

11. The system of claim 7, the operations further comprising:
    changing the user profile to include a fourth location rather than the second location based on a positioning of the first user interface element of the first application selected by other users; and
    moving the second user interface element to be consistent with the fourth location of the first user interface element of the first application in the user profile.

12. The system of claim 7, wherein moving the second user interface element of the second application does not interfere with other user interface elements of the second application.

13. A non-transitory machine-readable storage medium storing executable instructions, which when executed by a processing device, cause the processing device to perform operations comprising:
    receiving a user profile that comprises a first location of a first user interface element of a first application, the first user interface element configured to perform a function;
    receiving an indication of the first user interface element being moved to a second location;
    changing the user profile to include the second location rather than the first location;
    determining that a second user interface element of a second application performs the function;
    determining that a third location of a user interface element of the second application is different from the second location of the first user interface element of the first application in the user profile; and
    in response to determining that the second user interface element of the second application performs the function, moving the second user interface element of the second application to be consistent with the second location of the first user interface element of the first application in the user profile.

14. The non-transitory machine-readable storage medium of claim 13, wherein the first user interface element of the first application is an icon used to execute the function.

15. The non-transitory machine-readable storage medium of claim 13, wherein the user profile is associated with login credentials or authentication tokens.

16. The non-transitory machine-readable storage medium of claim 13, wherein moving the second user interface element of the second application further comprises moving the second user interface element to match the second location of the first user interface element of the first application in the user profile.

17. The non-transitory machine-readable storage medium of claim 13, the operations further comprising:

changing the user profile to include a fourth location rather than the second location based on a positioning of the first user interface element of the first application selected by other users; and moving the second user interface element to be consistent with the fourth location of the first user interface element of the first application in the user profile.

18. The non-transitory machine-readable storage medium of claim 13, wherein moving the second user interface element of the second application does not interfere with other user interface elements of the second application.

19. The method of claim 1, wherein the user profile further includes a primary purpose of the first application, and moving the second user interface element of the second application includes moving the second user interface element based on the second user interface element also having the primary purpose.

20. The system of claim 7, wherein the user profile further includes a primary purpose of the first application, and moving the second user interface element of the second application includes moving the second user interface element based on the second user interface element also having the primary purpose.

* * * * *